United States Patent
Gutmann

[15] 3,665,188
[45] May 23, 1972

[54] METHOD AND APPARATUS FOR TESTING THE INDIVIDUAL EMISSIVE PROPERTIES OF A PLURALITY OF RADIOACTIVE SPECIMENS

[72] Inventor: Johannes Gutmann, Geneva, Switzerland
[73] Assignee: Sen Electronique
[22] Filed: Aug. 1, 1969
[21] Appl. No.: 846,878

[30] Foreign Application Priority Data
Aug. 16, 1968 Switzerland ..........................1238/68

[52] U.S. Cl. ...................................250/83.3 R, 250/106 SC
[51] Int. Cl. ........................................................G01t 1/20
[58] Field of Search ..............................250/83.3 R, 106 SC

[56] References Cited
UNITED STATES PATENTS 3,271,574  9/1966  Dawson et al. ...................250/106 SC
3,389,251  6/1968  Rainbault et al. ............250/106 SC X

*Primary Examiner*—Archie R. Borchelt
*Attorney*—Ernest G. Montague

[57] ABSTRACT

The radiation emanating from a plurality of radioactive specimens is examined by means of detectors arranged to each receive radiation emitted from two or three specimens, simultaneously, each specimen emitting radiation to a group of two or three detectors respectively. Coincidences of detection are ascertained by double and/or triple AND gates connected to the outputs of each group of detectors and heights of pulses emitted by the detectors are added by a transformer matrix, each transformer of the matrix being connected to the output of a group of the detectors. The sums are then recorded and the results analyzed by a digital computer.

9 Claims, 8 Drawing Figures

METHOD AND APPARATUS FOR TESTING THE INDIVIDUAL EMISSIVE PROPERTIES OF A PLURALITY OF RADIOACTIVE SPECIMENS

The invention relates to a method of testing the individual emissive properties of a plurality of radioactive specimens and apparatus therefor.

As a result of the wide use of labeled molecule tracer techniques, the emission properties of very large numbers of radioactive specimens have to be ascertained.

In a technique already known, the specimens are placed in a scintillator and examined individually with counting heads, each consisting of two or more photomultiplier detectors arranged so as to select coincidences of emission, which are the only means of distinguishing the emission from the specimen itself from stray radiation. This method is laborious, since the number of detectors has to be twice the number of specimens observed.

The object of the present invention is a procedure whereby the respective emissions from several different specimens may be simultaneously detected, using a smaller number of detectors than in the procedure of the above stated prior art.

Accordingly, the invention provides a method of testing the individual emissive properties of a plurality of radioactive specimens, by the simultaneous detection of the emission from each specimen with two or more detectors, in order to select coincidences of detected events, with the characteristic feature that a plurality of specimens are examined simultaneously with the same detector, and that the data received by the detectors are logically analyzed in order to ascertain the emissive properties of each individual specimen.

The invention also provides apparatus for testing the individual emissive properties of a plurality of radioactive specimens comprising means for supporting the specimens, detectors arranged relative to said means so that each examines a plurality of specimens supported by the support means simultaneously, and recording means connected to the detectors to record the data received by the detectors.

A specific embodiment of the invention will now be described by way of example with reference to the accompanying drawings in which.

I GENERAL LAYOUT OF THE SYSTEM

Figure 1:
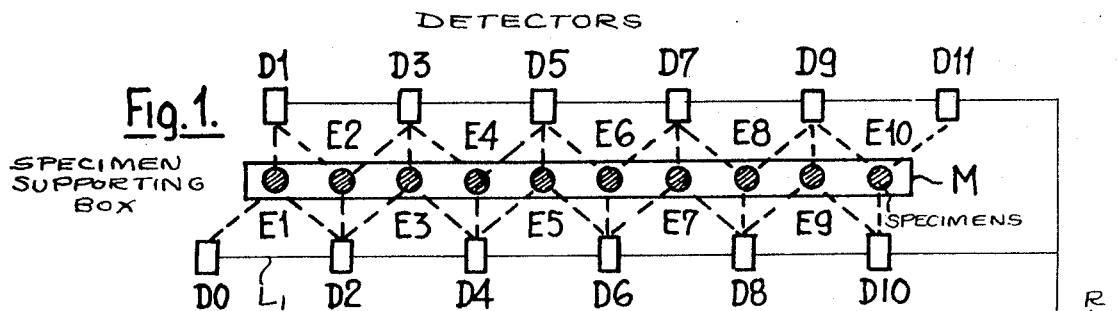
FIG. 1 is a diagram showing an arrangement of detectors and specimens for examination thereby.

The equipment shown in FIG. 1 comprises an arrangement for examining the specimens, comprising a specimen supporting box M with recesses to receive 10 containers in line at equal distances apart. These containers are transparent, and each will contain one of the radioactive specimens E1, E2, ... , E10, the emission from which is to be determined. In these specimens the radioactive material is diluted or emulsified in a scintillator, which may be a liquid, a jelly or a solid.

On each side of the Box M, detectors Do, D1, D2, . . . , D11 are placed, each arranged so as to examine simultaneously three specimens E, except the first and last, which examine only one specimen, and the ones adjoining these, which examine only two.

The detectors D are photomultipliers of ordinary design, and the broken lines indicate the specimens observed by the various detectors.

Each specimen E is therefore, observed by three detectors D, and the electrical circuits are so arranged as to allow the emission properties of each individual specimen to be determined by recording double and triple coincidences of emission, as described below. A recording means R records the data received by the detectors via a means for connecting the recording means to the detectors $L_1$. A means $L_2$ connects the recording means R to a computer means C which is programmed to perform a logical analysis of the data received by the detectors in order to ascertain the emissive properties of each individual specimen.

Figure 2:
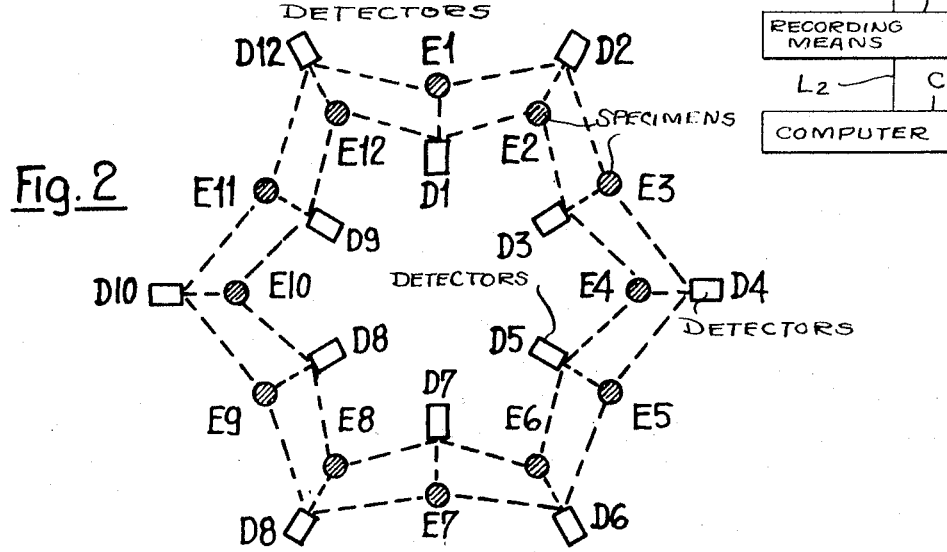
FIG. 2 is a diagram showing an alternative arrangement of detectors and specimens.

In the variants shown in FIG. 2, the specimens E1, E2, . . . , E12 are arranged in a circle, and each is again examined by three detectors D, as shown by the broken lines. In this arrangement, the number of detectors needed is equal to the number of specimens, whereas in the arrangement shown in FIG. 1, the number of detectors has to be two more than the number of specimens.

II RECORDING AND ANALYSIS OF COINCIDENCES

The reading of coincidences will be described by reference to FIGS. 3 and 4, which are parts of electrical circuit diagrams for the equipment.

Figure 3:
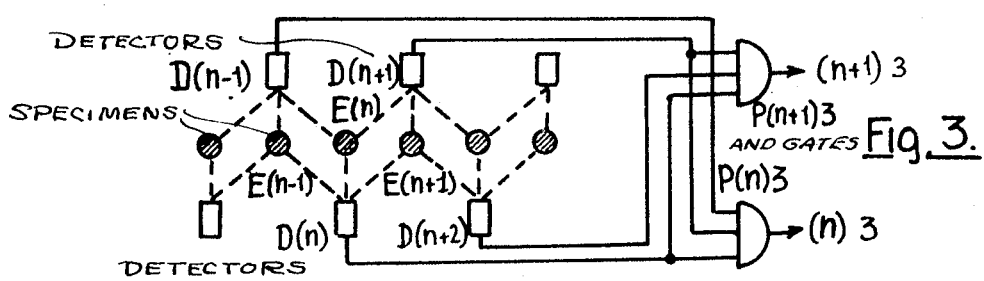
FIG. 3 shows schematically part of a circuit arrangement used when detecting and recording triple coincidence emission.

The circuit shown in FIG. 3 allows triple coincidences to be recorded for any specimen. $E(n)$ observed by the three detectors $D(n-1)$, $D(n)$ and $D(n+1)$. A flash of light which occurs in the scintillator in the specimen concerned is simultaneously recorded by these three detectors. The corresponding electrical pulses produced by the three detectors, therefore, coincide in time, and a triple coincidence of the signals given by the detectors $D(n-1)$, $D(n)$ and $D(n+1)$ corresponds to each event in the specimen $E(n)$. Similarly, an event in the specimen $E(n+1)$ causes a triple coincidence of the signals from the three detectors $D(n)$, $D(n+1)$, $D(n+2)$; and so on. The triple coincidence of the signals from the detectors $D(n-1)$, $D(n)$ and $D(n+1)$, which relates to the specimen $E(n)$, generates an electrical pulse at the output of an AND gate at $P(n)3$. Likewise, a triple coincidence relating to the specimen $E(n+1)$ generates a pulse at the output of a gate $P(n+1)3$.

The triple coincidence of the signals from three consecutive detectors, therefore, allows an event to be assigned to the specimen in the central position with respect to these three detectors.

The assignment does, however, involve a certain ambiguity, since a triple coincidence can also occur if there is by chance a pulse in specimen $E(n-1)$ at the same time as in $E(n+1)$. There can, moreover, be chance triple coincidences in the background noise pulses of the three detectors. But such triple coincidences caused by chance events are rare, and the number of them can be accurately found by a statistical calculation.

Figure 4:
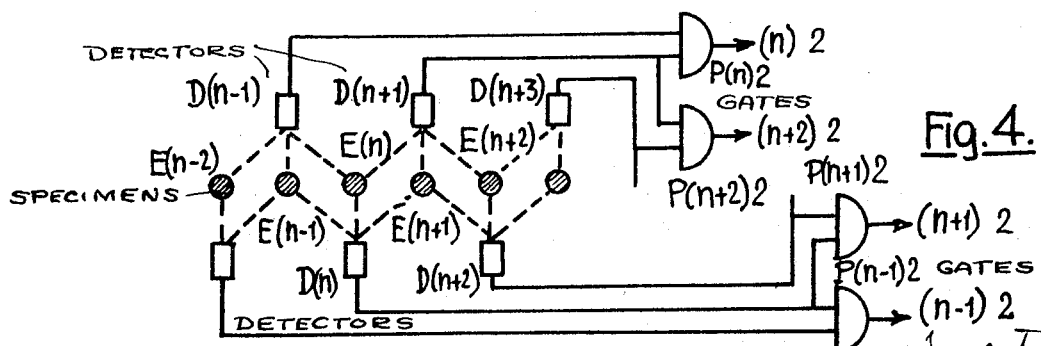
FIG. 4 shows schematically part of a circuit arrangement used when detecting and recording double coincidence emission.

The circuit shown in FIG. 4 makes it possible to record double coincidences also. For instance, a gate $P(n)2$ reacts to a double coincidence between the detectors $D(n-1)$ and $D(n+1)$, which most probably relates to an emission from specimen $E(n)$. Gates $P(n-1)2$, $P(n+1)2$ and $P(n+2)2$ react respectively to emission from specimens $E(n-1)$, $E(n+1)$ and $E(n+2)$. By means of these various double coincidence gates, any ambiguity is entirely removed, except for chance simultaneity.

It would not be possible to use double coincidence gates connected to consecutive pairs of detectors $D(n-1)$ and $D(n)$ and $D(n+1)$, since the double coincidences found could not be definitely assigned to the specimen $E(n)$: for example, a pulse in $E(n-1)$ would also cause a coincidence of signals from the detectors $D(n)$ and $D(n-1)$.

Figure 5:
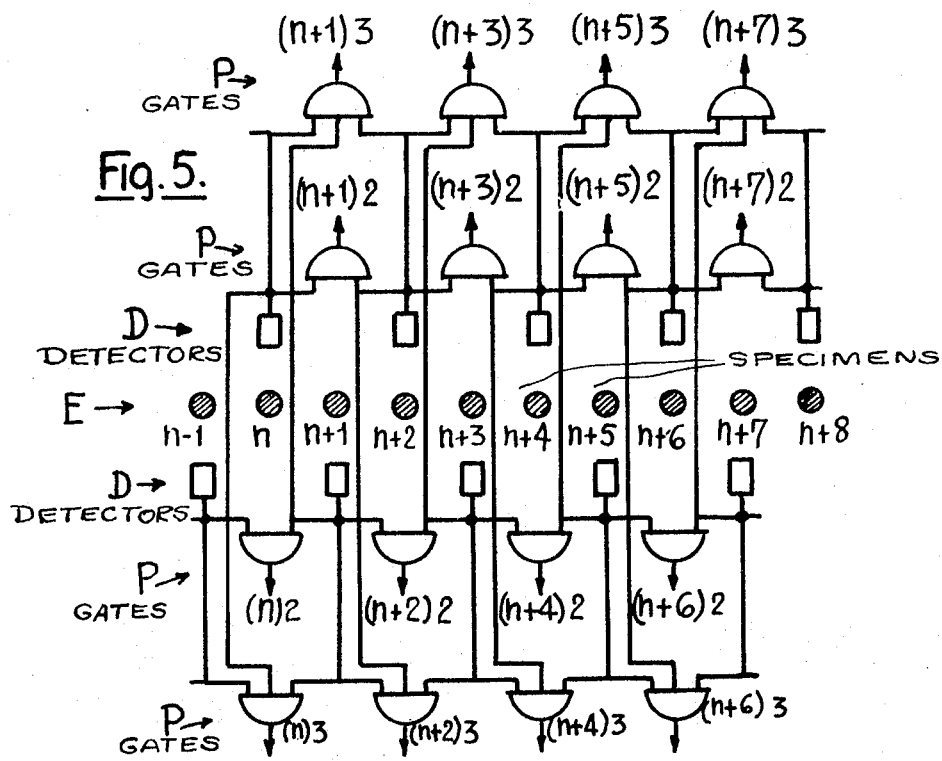
FIG. 5 shows schematically part of a circuit arrangement used when detecting and recording both double and triple coincidence emissions.

The preferred layout of the equipment is as shown in FIG. 5, so that both triple and double coincidences can be simultaneously detected. The gates $P(n)3$, $P(n+1)3$, $P(n+2)3$ etc. react through triple coincidences to emissions from the specimens E($n$), E($n$+1), E($n$+2) etc; the gates P($n$)2, P($n$+1)2, P($n$+2)2 etc. react through double coincidences to emissions from the same specimens E($n$), E($n$+1), E($n$+2) etc.

III MEASUREMENT OF PULSE HEIGHTS

Figure 6:
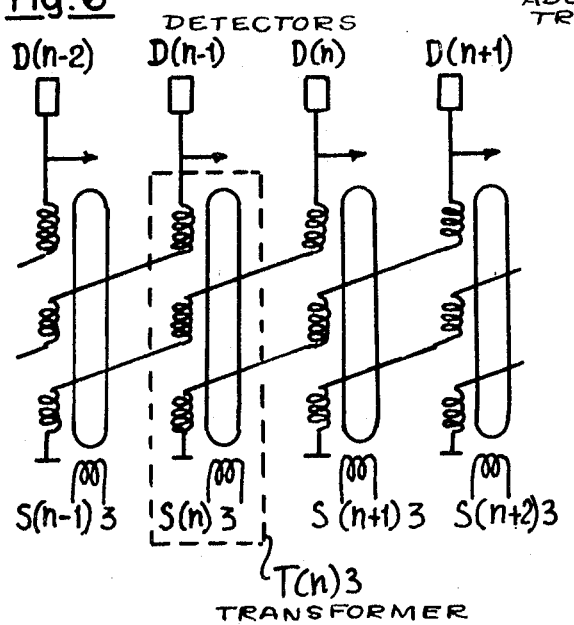
FIG. 6 shows part of a transformer matrix for adding currents from detectors for triple coincidence emission.

The currents from the detectors D connected in (double or triple) coincidence are added, for example by means of a transformer matrix. FIG. 6 is a diagram of such a matrix for triple coincidences; a transformer T($n$)3, for instance, adds the currents from the three detectors D($n$−1), D($n$) and D($n$+1); these currents are also passed to the gate P($n$)3 which records the triple coincidence enabling the emission to be assigned to the specimen E($n$). Thus the transformer T($n$)3 carried out the operation $$\text{Lin } 3/2 \; n = S(n)3.$$

In other variants, preamplifiers can be placed at the detector outputs, or an electronic adder may be used, for example.

Figure 7:
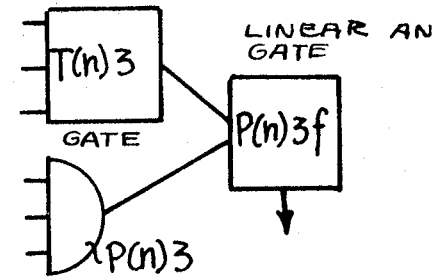
FIGS. 7 and 8 show parts of circuit arrangements for recording triple and double coincidences, respectively.

As shown in FIG. 7, the signals from the addition transformer T($n$)3 are passed to a linear AND gate P($n$)3$f$ together with those from the corresponding triple coincidence gate P($n$)3, and the output signals from this final gate P($n$)3$f$ are the triple coincidence signals for the specimen E($n$); these must be subjected to pulse height analysis, and for this purpose they are passed to an appropriate store.

Figure 8:
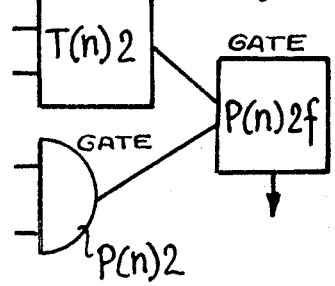

Double coincidence output signals P($n$)2$f$ are obtained in the same manner, as shown in FIG. 8.

Pulse height analysis can be carried out either by means of a central analyzer which operates on the various channels according to instructions from a computer, or by assigning to each channel a discriminator with one or more thresholds, whose output is placed in a store which is then examined by the computer. To transfer data in this way from the store to the computer, the counting process can be stopped either throughout the detector system or only temporarily in the relevant channel (the stoppage time being the same in each channel at the completion of the measurement), or not at all. The data passed to the computer are stored in it and processed as described in Section V.

IV CALIBRATION, EFFICIENCY AND BACKGROUND

The detectors D are calibrated by means of a set of dishes containing a standard radioactive material. By this means, all the detectors can be tested, adjusted and calibrated.

Various methods can be used to determine the efficiency of the counting equipment.

By means of the ratio between the double and triple coincidence rates, the efficiency may be found by calculations based on an initial calibration. This is done by the computer in which the calibration data are stored.

The specimens can also be irradiated by an external source and the resulting additional count rate determined. The efficiency for the specimen can be calculated by the computer, again on the basis of an initial calibration of the system.

Two different kinds of background noise are to be distinguished. Background proper is due to stray emission in the detectors and is from the natural ambient radioactivity. A further background component arises because each detector receives radiation from three sources and not only from the one being measured.

The detector background is easily determined by measuring the double and triple coincidence rates when there are no radioactive sources present. The same applies to the background from the natural ambient radioactivity. The further background due to additional irradiation of the detectors can be found as follows. The uncorrected measurement of the specimens gives a first approximation to the decay spectrum. The chance coincidence rate is, therefore, known to a first approximation, since it is governed by statistical laws and can be calculated by the computer. In this way background can be determined for each specimen by one or two successive approximations.

V ANALYSIS OF THE PULSE SPECTRUM AND DERIVATION OF THE PROPERTIES OF THE CORRESPONDING RADIOACTIVE SOURCE

The equipment is preferably provided with a computer able to perform the following tasks.
1. Store all data coming from the detectors during an experiment.
2. Store all data concerning calibration, efficiency and background.
3. Control the transfer of data.
4. Evaluate the data by
   a. determining and subtracting the background radioactivity,
   b. correcting the measured spectra for the purpose of the calibration and the efficiency determination,
   c. Assigning to each specimen the appropriate decay rates in the various energy ranges defined by the discriminator thresholds.
5. Arrange the evaluated data so as to give the properties of each specimen.
6. Convert these properties to digital form so that they can be made available on magnetic tape, punched tape, punched cards, or print-out.

VI ADVANTAGES OF THE PROCEDURE

The coincidence method can be employed while using a small number of detectors, because several different specimens are examined simultaneously with the same detector and the data received by the detectors are logically analyzed in order to ascerta the emission properties of each individual specimen.

The reduction in the number of detectors is an important advantage because of the high price of photomultiplier detectors.

Variants of the procedure can be used to determine coincidences of only one order, or of a higher order.

In the laboratory, the equipment may be restricted to the detection system and the store needed to record the readings, the actual analysis being then carried out by a central computer which may be at a distance and be used for other purposes also.

I claim:
1. A method of testing the individual emissive properties of a plurality of radioactive specimens, by simultaneously detecting the emission from each specimen with a plurality of detectors, and selecting coincidences of detected events, with the characteristic feature that a plurality of specimens are examined simultaneously with the same detector, and logically analyzing the data received by the detectors in order to ascertain the emissive properties of each individual specimen.

2. Apparatus for testing the individual emissive properties of a plurality of radioactive specimens comprising means for supporting the specimens, a plurality of detectors arranged adjacent to said means each detector receiving radiation emanating from a plurality of specimens supported by the support means simultaneously, recording means to record the data received by the detectors, and means connecting the recording means to the detectors.

3. Apparatus as claimed in claim 2, wherein each detector receives radiation emanating from three different specimens simultaneously.

4. Apparatus as claimed in claim 3, wherein each specimen emits radiation to at least three detectors simultaneously.

5. Apparatus as claimed in claim 2, wherein the recording means can record emission coincidences selected from the group of double and triple emission coincidences, for each specimen.

6. Apparatus as claimed in claim 5, wherein said detectors emit an electrical output and said means includes AND gates selected from the group of double and triple AND gates, there being means electrically connecting the AND gates to a group of detectors arranged to receive radiation emanating from the same specimen.

7. Apparatus as claimed in claim 5 comprising means for measuring the height of electrical pulses generated by the detectors when such coincidences occur and means electrically connecting the measuring means to the detectors.

8. Apparatus as claimed in claim 7 wherein the pulse height measuring means comprise a transformer matrix, means for connecting each transformer of the matrix to a group of detectors arranged to receive radiation emanating from the same specimen, each transformer measuring pulses from such detectors.

9. Apparatus as claimed in claim 2, comprising a computer means for performing a logical analysis of the data received by the detectors in order to ascertain the emissive properties of each individual specimen and means electrically connecting the computer means to the recording means.

* * * * *